(12) United States Patent
Yoshimura et al.

(10) Patent No.: US 10,557,506 B2
(45) Date of Patent: Feb. 11, 2020

(54) DOG CLUTCH

(71) Applicants: TOYOTA JIDOSHA KABUSHIKI KAISHA, Toyota-shi, Aichi-ken (JP); AISIN AI CO., LTD, Nishio-shi, Aichi-ken (JP); KABUSHIKI KAISHA TOYOTA CHUO KENKYUSHO, Nagakute-shi, Aichi-ken (JP)

(72) Inventors: Tomohiro Yoshimura, Toyota (JP); Akihiko Ichikawa, Toyota (JP); Shinichi Takeuchi, Nisshin (JP); Jun Yabuta, Nagoya (JP); Isamu Shiotsu, Nagakute (JP)

(73) Assignees: TOYOTA JIDOSHA KABUSHIKI KAISHA, Toyota (JP); KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 299 days.

(21) Appl. No.: 15/782,344

(22) Filed: Oct. 12, 2017

(65) Prior Publication Data
US 2018/0119750 A1    May 3, 2018

(30) Foreign Application Priority Data
Oct. 27, 2016 (JP) .................................. 2016-211124

(51) Int. Cl.
*F16D 11/14* (2006.01)
*F16D 23/02* (2006.01)
*F16D 11/00* (2006.01)

(52) U.S. Cl.
CPC ............ *F16D 11/14* (2013.01); *F16D 23/025* (2013.01); *F16D 2011/002* (2013.01); *F16D 2011/006* (2013.01)

(58) Field of Classification Search
USPC ........................................................ 192/69.83
See application file for complete search history.

(56) References Cited

U.S. PATENT DOCUMENTS 3,044,592 A * 7/1962 Noll ........................ F16D 11/10
192/69.83
2013/0228027 A1    9/2013 Ikeya et al.
(Continued)

FOREIGN PATENT DOCUMENTS

JP    2012-127471 A    7/2012
JP    2015-140892 A    8/2015
(Continued)

*Primary Examiner* — Mark A Manley
(74) *Attorney, Agent, or Firm* — Oliff PLC

(57) ABSTRACT

A dog clutch includes a rotating member including first dog teeth, an annular dog ring including second dog teeth, and an annular dog sleeve. The rotating member includes first protrusions protruding radially outwardly from the outer circumferences of crests or troughs of the first dog teeth, the dog sleeve includes second protrusions that are configured to come into contact with the first protrusions in a circumferential direction when the dog sleeve moves toward the rotating member in an axial direction, and the first dog teeth and the second dog teeth are disposed at positions at which the first dog teeth and the second dog teeth are able to be engaged with each other in the circumferential direction in a state in which the first protrusions and the second protrusions are in contact with each other.

4 Claims, 10 Drawing Sheets

(56) References Cited

U.S. PATENT DOCUMENTS

2013/0240318 A1* 9/2013 Mori ............... F16D 11/10
                                                192/69.9
2016/0040726 A1* 2/2016 Shiotsu ........... F16D 11/14
                                                74/333

FOREIGN PATENT DOCUMENTS

| JP | 2015-140893 A | 8/2015 |
| JP | 2016-061411 A | 4/2016 |
| WO | 2012/066740 A1 | 5/2012 |

* cited by examiner

DOG CLUTCH

INCORPORATION BY REFERENCE

The disclosure of Japanese Patent Application No. 2016-211124 filed on Oct. 27, 2016 including the specification, drawings and abstract is incorporated herein by reference in its entirety.

BACKGROUND

1. Technical Field

The present disclosure relates to the structure of a dog clutch provided in a vehicle.

2. Description of Related Art

A vehicle provided with a dog clutch that is configured to be connected by engaging dog teeth formed in a first rotating member with dog teeth formed in a second rotating member is known. An example of the dog clutch is an engagement clutch provided in a transmission described in Japanese Unexamined Patent Application Publication No. 2012-127471 (JP 2012-127471 A). In JP 2012-127471 A, the transmission that is configured to include a plurality of dog clutches (engagement clutches) and shifts a plurality of gear stages by switching between connection and disconnection stages of the dog clutches is disclosed.

SUMMARY

In a transmission provided with dog clutches as in JP 2012-127471 A, when first dog teeth and second dog teeth included in the dog clutch are engaged with each other, the first dog teeth and the second dog teeth need to be engaged at a timing at which the crest of the first dog tooth and the trough of the second dog tooth are aligned with each other. Therefore, the period of the timing is short. Contrary to this, the period during which the dog teeth can be engaged with each other can be increased by increasing the circumferential length of the trough of the first dog tooth. However, due to the increase in the circumferential length of the trough, the circumferential length of the crest of the dog tooth becomes short. Here, when the first dog teeth and the second dog teeth are engaged with each other, an impact load is applied to the dog teeth. Therefore, in consideration of the durability of the dog teeth, there is a limitation on the reduction in the circumferential length of the crest of the dog tooth. As a result, it becomes difficult to increase the period during which the dog teeth can be engaged.

The present disclosure provides a dog clutch in which a period during which dog teeth can be engaged can be increased without deteriorating the durability of the dog teeth in the dog clutch provided in a vehicle.

A first aspect of the present disclosure relates to a dog clutch including: a rotating member including first dog teeth; an annular dog ring including second dog teeth that are configured to be engaged with the first dog teeth; and an annular dog sleeve that is fitted to the dog ring such that the dog sleeve is not able to rotate relative to the dog ring and is relatively movable in the axial direction of the dog clutch. The rotating member includes first protrusions protruding radially outwardly from the outer circumferences of crests or troughs of the first dog teeth. The dog sleeve includes second protrusions that are configured to come into contact with the first protrusions in the circumferential direction of the dog clutch when the dog sleeve moves toward the rotating member in the axial direction. A circumferential length of each of the first protrusions is shorter than the circumferential length of each of the crests or the troughs of the first dog teeth on which the first protrusions are located. The first dog teeth and the second dog teeth are disposed at positions at which the first dog teeth and the second dog teeth are configured to be engaged with each other in the circumferential direction in a state in which the first protrusions and the second protrusions are in contact with each other.

In the dog clutch according to the aspect, the rotating member may include the first protrusions protruding from the outer circumferences of the crests of the first dog teeth. The second protrusion may be shorter than a circumferential length of a crest of each of the second dog teeth.

In the dog clutch according to the aspect, the rotating member may include the first protrusions protruding from the outer circumferences of the troughs of the first dog teeth. The second protrusion may be shorter than the circumferential length of a trough of each of the second dog teeth.

The dog clutch according to the aspect may further include a hub positioned on the inner circumferential side of the dog ring. The hub may be configured to be connected to a rotating shaft such that the inner circumferential portion of the hub is not able to rotate relative to the rotating shaft. The hub may include a columnar portion protruding radially outwardly from the outer circumferential surface of the hub. The dog ring may include a long hole that accommodates the columnar portion. The long hole may be inclined at a predetermined gradient with respect to the circumferential direction of the dog ring.

With the dog clutch according to the aspect, when the dog sleeve moves toward the rotating member in the axial direction, the second protrusion also moves toward the rotating member. Therefore, the first protrusion and the second protrusion enter the state capable of coming into contact with each other in the circumferential direction. In addition, when the first protrusion and the second protrusion come into contact with each other as the rotating member and the dog sleeve rotate relative to each other, the first dog teeth and the second dog teeth enter the state capable of being engaged with each other. Here, since the circumferential length of the first protrusion is shorter than the circumferential length of the crest or the trough of the first dog tooth on which the first protrusion is formed, the interval between the first protrusions in the circumferential direction is greater than the circumferential length of the trough or the crest of the first dog tooth. Here, the period during which the second protrusion can be interposed between the first protrusions adjacent to each other in the circumferential direction substantially becomes the period during which the first dog teeth and the second dog teeth can be engaged with each other. As a result, the period during which the first dog teeth and the second dog teeth can be engaged with each other can be made longer than that in the related art. In the related art, since the timing at Which the crest of the first dog tooth and the trough of the second dog tooth are aligned with each other corresponds to the period during which the first dog teeth and the second dog teeth can be engaged with each other, the period is very short.

With the dog clutch according to the aspect, in the case where the first protrusion protrudes from the outer circumference of the crest of the first dog tooth, since the second protrusion is formed to be shorter than the circumferential length of the crest of the second dog tooth, the period during which the second protrusion can be interposed between the first protrusions adjacent to each other in the circumferential direction is increased. Furthermore, in the case where the first protrusion protrudes from the outer circumference of the trough of the first dog tooth, since the second protrusion is formed to be shorter than the circumferential length of the trough of the second dog tooth, the period during which the second protrusion can be interposed between the first protrusions adjacent to each other in the circumferential direction is increased. Therefore, the period during which the first dog teeth and the second dog teeth can be engaged with each other can be further increased.

With the dog clutch according to the aspect, when the first protrusion and the second protrusion come into contact with each other, the rotational speed of the dog sleeve and the dog ring becomes equal to the rotational speed of the rotating member having the first dog teeth formed therein. At this time, the impact load applied to the first protrusion and the second protrusion is proportional to the inertial mass of the dog sleeve and the dog ring which have a change in the rotational speed. Here, since the inertial mass of the dog sleeve and the dog ring is sufficiently smaller than that of the rotating shaft and the like, the impact load decreases. Therefore, a reduction in the durability of the first protrusion and the second protrusion can be suppressed. In addition, when the first protrusion and the second protrusion come into contact with each other, the hub and the rotating shaft rotate integrally with each other while the dog ring and the rotating member rotate integrally with each other such that the dog ring and the hub rotate relative to each other. When the dog ring and the hub rotate relative to each other, the columnar portion accommodated in the long hole moves toward the other side of the long hole in the longitudinal direction of the long hole. Here, since the long hole is inclined at the predetermined gradient with respect to the circumferential direction, by adjusting the length and the gradient of the long hole in the longitudinal direction of the long hole, the dog ring can be moved toward the rotating member, and thus the first dog teeth and the second dog teeth can be engaged with each other when the columnar portion moves within the long hole.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the drawings. In the following embodiments, the drawings are appropriately simplified or modified, and the dimensional ratio, shape, and the like of each part are not always drawn accurately.

Figure 1:
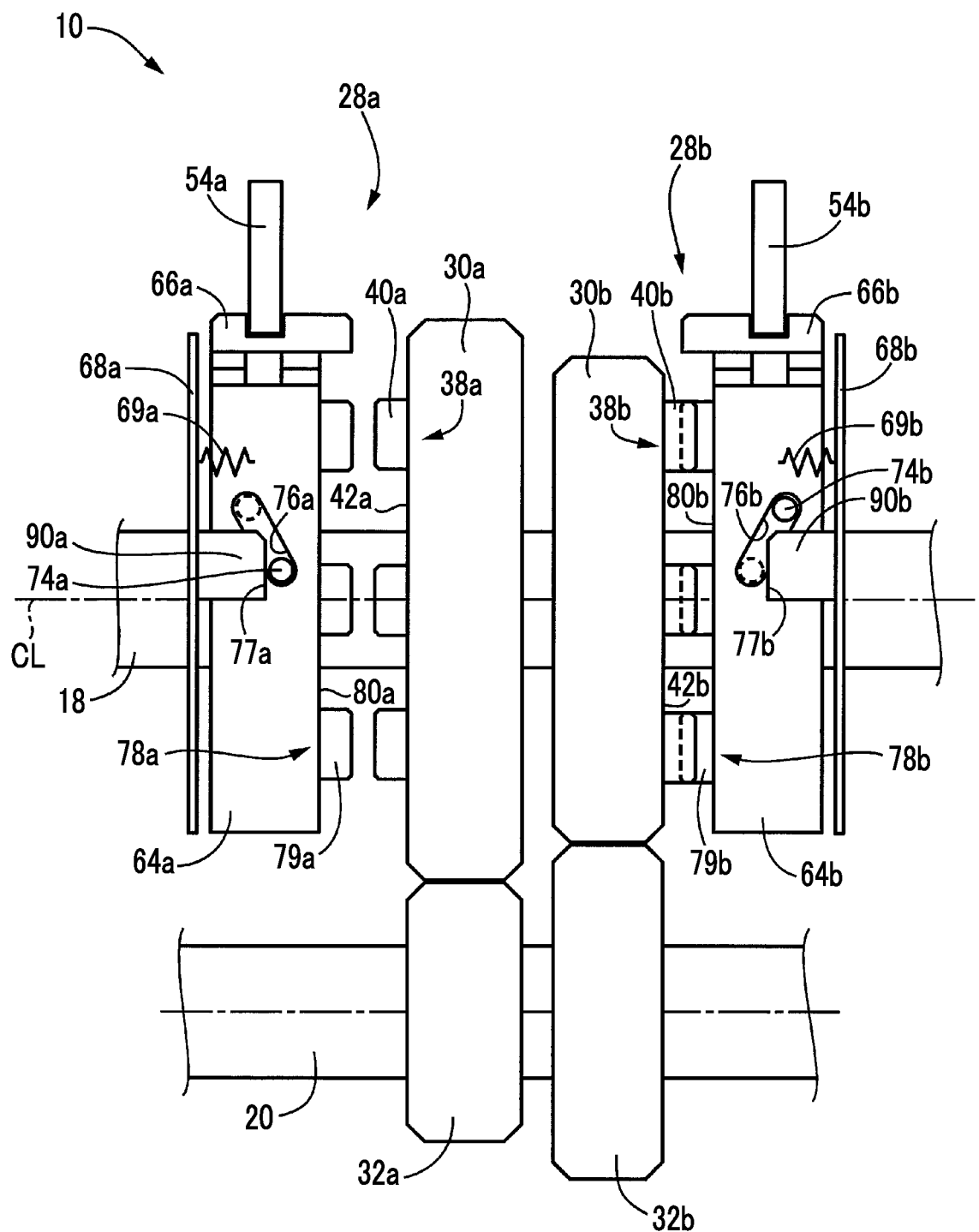
FIG. 1 is a schematic view schematically illustrating a part of a vehicle transmission to which an embodiment of the present disclosure is applied.

FIG. 1 is a schematic view schematically illustrating a part of a vehicle transmission 10 (hereinafter, referred to as a transmission 10) to which an embodiment of the present disclosure is applied. The transmission 10 is a parallel two-shaft type transmission that is provided on a power transmission path between an engine (not illustrated) and drive wheels and shifts a plurality of gear stages (transmission stages) by decreasing or increasing the rotational speed input from the engine with a predetermined gear ratio γ. In FIG. 1, a part of the transmission 10, specifically, a configuration for establishing two gear stages is solely illustrated. However, in reality, the transmission 10 further includes gears and dog clutches (not illustrated), and the like, and is configured to shift the gear stages.

The transmission 10 includes an input shaft 18 connected to the engine via a clutch (not illustrated), and the like to transmit power, and a countershaft 20 that is disposed in parallel to the input shaft 18 and is connected to the drive wheels to transmit power to the drive wheels. The input shaft 18 corresponds to a rotating shaft of the SUMMARY.

The input shaft 18 is provided with a first transmission gear 30a which is rotatable relative to the input shaft 18 and a second transmission gear 30b which is rotatable relative to the input shaft 18. Gear side dog teeth 38a that function as one side of dog teeth included in a first dog clutch 28a, which will be described later, are formed in the first transmission gear 30a. Gear side dog teeth 38b that function as one side of dog teeth included in a second dog clutch 28b, which will be described later, are formed in the second transmission gear 30b. The first dog clutch 28a and the second dog clutch 28b correspond to a dog clutch of the SUMMARY, and the first transmission gear 30a and the second transmission gear 30b correspond to a rotating member of the SUMMARY.

The countershaft 20 is provided with a first counter gear 32a fixed to the countershaft 20 so as not to be rotatable relative to the countershaft 20 and a second counter gear 32b fixed to the countershaft 20 so as not to be rotatable relative to the countershaft 20. The first transmission gear 30a and the first counter gear 32a engage with each other and the second transmission gear 30b and the second counter gear 32b engage with each other.

The first dog clutch 28a is provided on the input shaft 18 at a position adjacent to the first transmission gear 30a in an axis CL direction. The second dog clutch 28b is provided on the input shaft 18 at a position adjacent to the second transmission gear 30b in the axis CL direction. Each of the first dog clutch 28a and the second dog clutch 28b is configured to include a pair of dog teeth (engagement teeth), is connected by engaging the dog teeth of the pair of dog teeth with each other, and is disconnected by releasing the engagement.

The first dog clutch 28a is an engagement clutch (connection and disconnection mechanism) that is provided at the position adjacent to the first transmission gear 30a in the axis CL direction (on the opposite side of the first transmission gear 30a from the second transmission gear 30b) for connection and disconnection between the input shaft 18 and the first transmission gear 30a. When the first transmission gear 30a and the input shaft 18 are switched to a state in which the first transmission gear 30a and the input shaft 18 are connected to each other via the first dog clutch 28a, the input shaft 18 and the countershaft 20 are connected to transmit power via the first transmission gear 30a and the first counter gear 32a, thereby shifting to a predetermined gear stage. Hereinafter, the gear stage of the transmission 10 formed when the first dog clutch 28a is connected is defined as an (N+1)-speed gear stage.

The second dog clutch 28b is an engagement clutch (connection and disconnection mechanism) that is provided at the position adjacent to the second transmission gear 30b (on the opposite side of the second transmission gear 30b from the first transmission gear 30a) for connection and disconnection between the input shaft 18 and the second transmission gear 30b. When the second transmission gear 30b and the input shaft 18 are switched to a state in which the second transmission gear 30b and the input shaft 18 are connected to each other via the second dog clutch 28b, the input shaft 18 and the countershaft 20 are connected to transmit power via the second transmission gear 30b and the second counter gear 32b, thereby shifting to a predetermined gear stage. Hereinafter, the gear stage of the transmission 10 formed when the second dog clutch 28b is connected is defined as an N-speed gear stage.

The first dog clutch 28a is operated by a first shift fork 54a. A dog sleeve 66a of the first dog clutch 28a, which will be described later, is fitted to the first shift fork 54a, and when the first shift fork 54a is moved in the axis CL direction via an actuator (not illustrated) or the like, the dog sleeve 66a of the first dog clutch 28a is also moved in the axis CL direction. At this time, the first dog clutch 28a is operated. The second dog clutch 28b is operated by a second shift fork 54b. A dog sleeve 66b of the second dog clutch 28b, which will be described later, is fitted to the second shift fork 54b, and when the second shift fork 54b is moved in the axis CL direction via an actuator (not illustrated) or the like, the dog sleeve 66b of the second dog clutch 28b is also moved in the axis CL direction. At this time, the second dog clutch 28b is operated.

As described above, when the first dog clutch 28a is connected, the transmission 10 is shifted to the (N+1)-speed gear stage, and when the second dog clutch 28b is connected, the transmission 10 is shifted to the N-speed gear stage. For an upshift from the N-speed gear stage to the (N+1)-speed gear stage, during the shift between the gear stages, the first shift fork 54a and the second shift fork 54b are controlled such that the second dog clutch 28b is disconnected while the first dog clutch 28a is connected. For a downshift from the (N+1)-speed gear stage to the N-speed gear stage, during the shift between the gear stages, the first shift fork 54a and the second shift fork 54b are controlled such that the first dog clutch 28a is disconnected while the second dog clutch 28b is connected.

Specifically, the position of the first shift fork 54a in the axis CL direction, at which the (N+1)-speed gear stage is established, and the position of the second shift fork 54b in the axis CL direction, at which the N-speed gear stage is established, are predetermined. When a command for the upshift from the N-speed gear stage to the (N+1)-speed gear stage is output, the first shift fork 54a and the second shift fork 54b are controlled such that the first shift fork 54a is moved to the position at which the (N+1)-speed gear stage is established and the second shift fork 54b is moved to a position at which the N-speed gear stage is not established (a disengagement position of the second dog clutch 28b; a neutral position). When a command for the downshift from the (N+1)-speed gear stage to the N-speed gear stage is output, the first shift fork 54a and the second shift fork 54b are controlled such that the first shift fork 54a is moved to a position at which the (N+1)-speed gear stage is not established (a disengagement position of the first dog clutch 28a; a neutral position) and the second shift fork 54b is moved to the position at which the N-speed gear stage is established.

Figure 2:
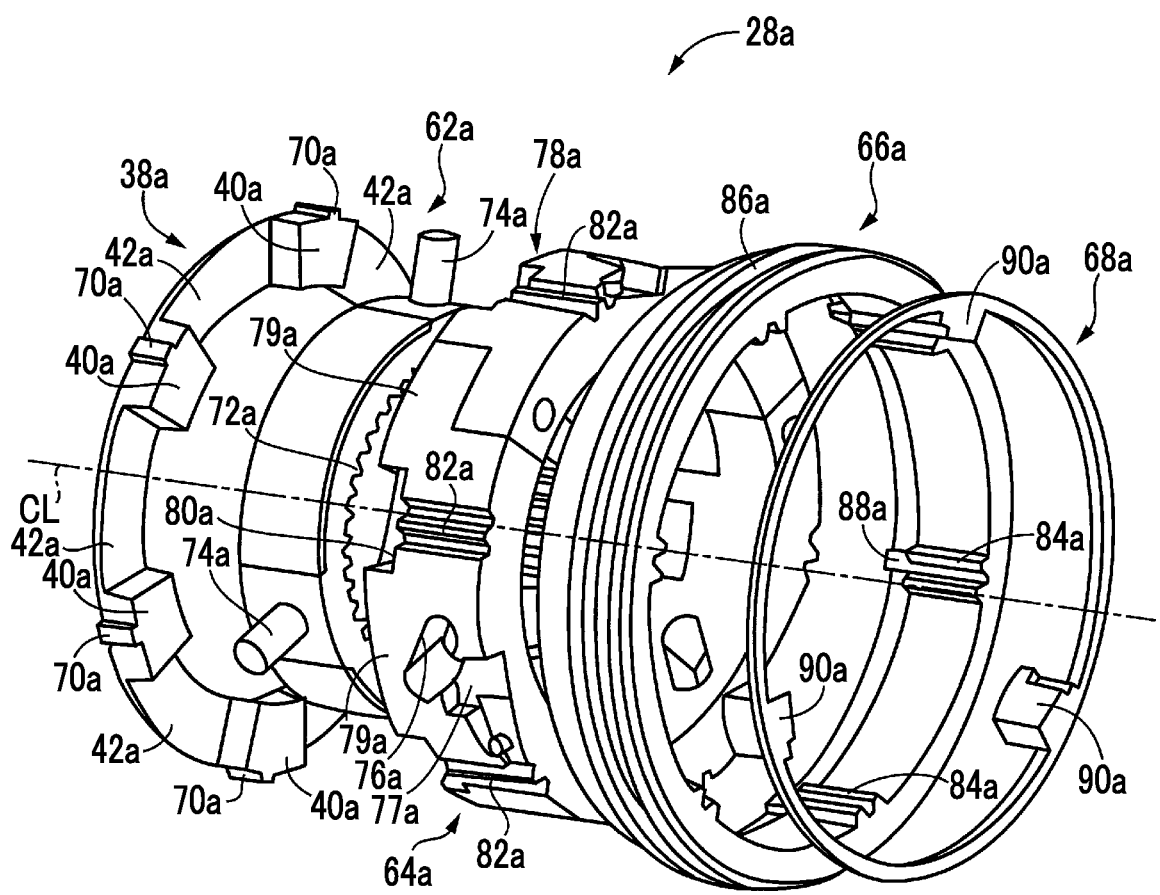
FIG. 2 is an exploded perspective view illustrating a first dog clutch in FIG. 1.
Figure 3:
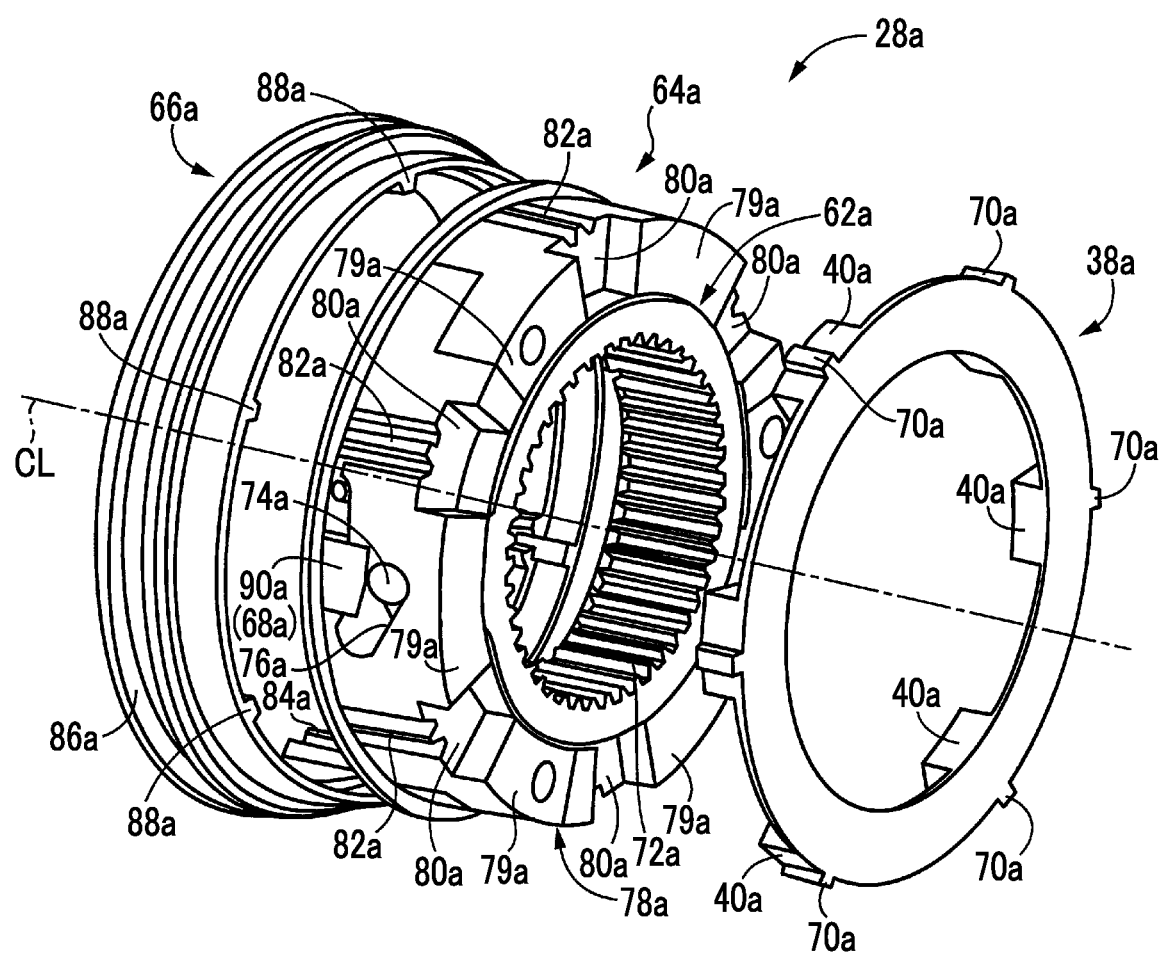
FIG. 3 is an exploded perspective view illustrating the first dog clutch in FIG. 1.

Next, the structure of the first dog clutch 28a will be described. In the following description, although the structure of the first dog clutch 28a is described, since the second dog clutch 28b basically has the same structure as that of the first dog clutch 28a, the description of the structure of the second dog clutch 28b will be omitted. FIGS. 2 and 3 are exploded perspective views illustrating the first dog clutch 28a. FIG. 2 corresponds to a perspective view of the first dog clutch 28a as viewed from a first side in the axis CL direction, and FIG. 3 corresponds to a perspective view of the first dog clutch 28a as viewed from a second side in the axis CL direction.

The first dog clutch 28a is configured to include the gear side dog teeth 38a formed in the first transmission gear 30a, a tripod hub 62a, a dog ring 64a, the dog sleeve 66a, a coasting lock key 68a, and a spring 69a (see FIG. 1). The tripod hub 62a corresponds to a hub of the SUMMARY.

The gear side dog teeth 38a are configured to include a plurality of (in the embodiment, six) crests 40a of the gear side dog teeth 38a (hereinafter, crests 40a of the dog teeth), the crests 40a protruding in a direction perpendicular to the axis CL direction, and a plurality of (in the embodiment, six) troughs 42a of the gear side dog teeth 38a (hereinafter, troughs 42a of the dog teeth), and the crests 40a and the troughs 42a are alternately arranged in the circumferential direction. In FIGS. 2 and 3, the first transmission gear 30a is omitted. However, the gear side dog teeth 38a are formed integrally with the first transmission gear 30a. The crest 40a of the dog tooth is formed in a fan shape as viewed in the axis CL direction and is formed to have a predetermined thickness in the axis CL direction.

In addition, outward protrusions 70a protruding radially outwardly from the surfaces (outer circumferential surfaces) of the crests 40a of the gear side dog teeth 38a formed radially outwardly from the axis CL are respectively formed on the surfaces. The outward protrusion 70a is formed as a part of the gear side dog tooth 38a and the first transmission gear 30a and is formed near the center of the crest 40a of the gear side dog tooth 38a in the circumferential direction. The outward protrusion 70a is formed in a rectangular shape as viewed in the direction perpendicular to the axis CL direction and is formed to have the same dimension as the thickness of the crest 40a of the dog tooth in the axis CL direction. The circumferential length of the outward protrusion 70a is shorter than the circumferential length of the crest 40a of the gear side dog tooth 38a. The trough 42a of the dog tooth is formed in a fan shape as viewed in the axis CL direction and is formed to have dimensions in which a crest 79a of a dog tooth 78a can be accommodated. The gear side dog teeth 38a correspond to first dog teeth of the SUMMARY, the crest 40a of the dog tooth corresponds to a crest of the first dog tooth of the SUMMARY, the trough 42a of the dog tooth corresponds to a trough of the first dog tooth of the SUMMARY, and the outward protrusion 70a corresponds to a first protrusion of the SUMMARY.

The tripod hub 62a is formed in an annular shape and is connected to the input shaft 18 so as not to rotate relative to the input shaft 18. Splined teeth 72a are formed on the inner circumferential side of the tripod hub 62a to be fitted to the input shaft 18. In addition, the outer circumferential surface of the tripod hub 62a is provided with a plurality of (in the embodiment, three) columnar portions 74a formed to have a columnar shape and protrude radially outwardly. The columnar portions 74a are formed at regular angles in the circumferential direction. The columnar portions 74a are accommodated in long holes 76a of the dog ring 64a, which will be described later, in a state of being assembled to the dog ring 64a as illustrated in FIG. 3.

The dog ring 64a is composed of a plurality of parts, and is formed in an annular shape by connecting the parts. The inner diameter of the dog ring 64a is set to a dimension that can accommodate the tripod hub 62a on the inner circumferential side. The dog ring 64a is provided with a plurality of (in the embodiment, three) long holes 76a having an elongated shape for accommodating the columnar portion 74a of the tripod hub 62a, the long holes 76a being formed at regular angles in the circumferential direction. The long hole 76a penetrates through the dog ring 64a in the radial direction and is formed in an elongated shape as viewed in the radially inward direction. The center line of the long hole 76a in the longitudinal direction is inclined at a predetermined gradient with respect to the circumferential direction (rotational direction) as viewed in the radially inward direction. As illustrated in FIG. 3, the columnar portion 74a of the tripod hub 62a is accommodated in the long hole 76a. Since the dog ring 64a is configured by connecting the parts, the dog ring 64a is integrally assembled in a state in which the columnar portion 74a is accommodated in the long hole 76a. In addition, in the dog ring 64a, a key groove 77a into which a key portion 90a of the coasting lock key 68a, which will be described later, is fitted is formed adjacent to the long hole 76a.

In addition, dog teeth 78a that can be engaged with the gear side dog teeth 38a are formed on the surface of the dog ring 64a facing the gear side dog teeth 38a. The dog teeth 78a are configured to include a plurality of (in the embodiment, six) crests 79a of the dog teeth 78a, the crests 79a protruding in the direction perpendicular to the axis CL direction, and a plurality of (in the embodiment, six) troughs 80a of the dog teeth 78a, and the crests 79a and the troughs 80a are alternately arranged in the circumferential direction. The crest 79a of the dog tooth 78a is formed in a fan shape as viewed in the axis CL direction and is formed to have substantially the same thickness as the crest 40a of the dog tooth in the axis CL direction. The trough 80a of the dog tooth 78a is formed in a fan shape as viewed in the axis CL direction and is formed to have dimensions in which the crest 40a of the dog tooth can be accommodated. The dog teeth 78a correspond to second dog teeth of the SUMMARY, the crest 79a of the dog tooth corresponds to a crest of the second dog tooth of the SUMMARY, and the trough 80a of the dog tooth corresponds to a trough of the second dog tooth of the SUMMARY.

The outer circumferential surface of the dog ring 64a is provided with a plurality of (in the embodiment, six) outer circumferential fitting teeth 82a formed at regular angles in the circumferential direction to be fitted to the dog sleeve 66a. The outer circumferential fitting teeth 82a are respectively formed at the same positions as the troughs 80a of the dog teeth 78a in the circumferential direction.

Figure 4:
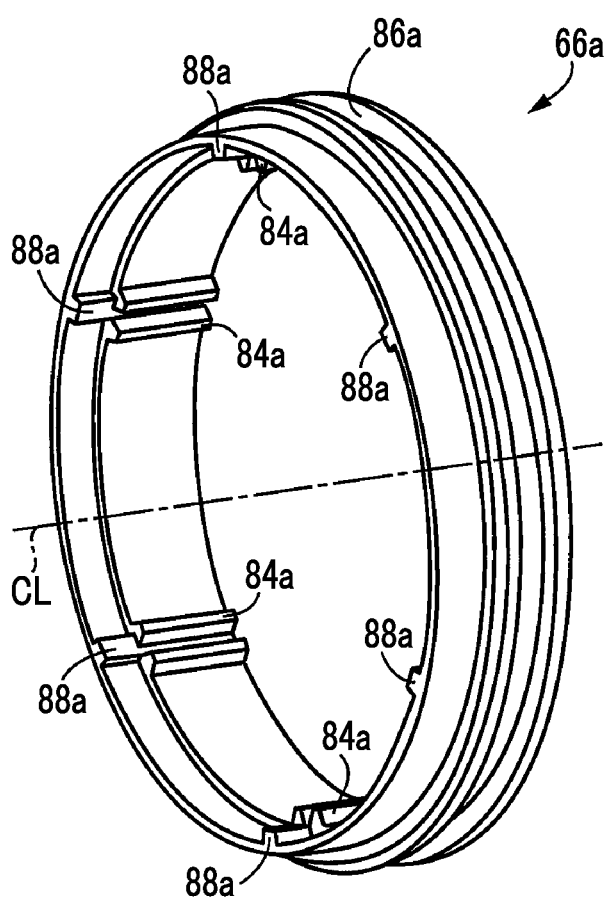
FIG. 4 is a parts view illustrating the structure of a dog sleeve in FIG. 2.

The dog sleeve 66a has an annular shape and is disposed on the outer circumferential side of the dog ring 64a at a state of being assembled to the dog ring 64a. FIG. 4 is a parts view illustrating the structure of the dog sleeve 66a. The inner circumferential surface of the dog sleeve 66a is provided with a plurality of (in the embodiment, six) inner circumferential fitting teeth 84a formed at regular angles in the circumferential direction to be fitted to the outer circumferential fitting teeth 82a of the dog ring 64a in the state of being assembled to the dog ring 64a. Therefore, in the state in Which the dog ring 64a and the dog sleeve 66a are assembled to each other, the dog sleeve 66a cannot rotate relative to the dog ring 64a and can relatively move in the axis CL direction. An annular groove 86a to be fitted to the first shift fork 54a is formed on the outer circumferential side of the dog sleeve 66a.

A plurality of (in the embodiment, six) inward protrusions 88a is provided. The inward protrusions 88a are formed at regular angles in the circumferential direction at the same positions as those of the inner circumferential fitting teeth 84a of the dog sleeve 66a in the circumferential direction to protrude radially inwardly from the inner circumferential surface of the dog sleeve 66a. The inward protrusion 88a and the inner circumferential fitting tooth 84a are formed to be aligned in the axis CL direction.

The inward protrusion 88a is formed in a rectangular shape as viewed in the direction perpendicular to the axis CL direction and has a predetermined dimension in the axis CL direction. The circumferential length of the inward protrusion 88a is shorter than the circumferential length of the crest 79a of the dog tooth 78a. The inward protrusion 88a is configured to come into contact with the outward protrusion 70a in the circumferential direction when the dog sleeve 66a moves toward the first transmission gear 30a in the axis CL direction. Specifically, the outward protrusion 70a and the inward protrusion 88a are formed at the same position in the radial direction with respect to the axis CL. Furthermore, when the dog sleeve 66a moves toward the first transmission gear 30a in the axis CL direction, at least portions of the outward protrusion 70a and the inward protrusion 88a overlap in the axis CL direction. The inward protrusion 88a corresponds to a second protrusion of the SUMMARY.

The inner circumferential side of the dog sleeve 66a is formed of two inner circumferential surfaces having different inner diameters, the inner circumferential fitting teeth 84a are formed on the inner circumferential surface with a smaller diameter (radially inward), and the inward protrusions 88a are formed on the inner circumferential surface with a larger diameter (radially outward). The surface of the inward protrusion 88a formed radially inwardly (top surface) is formed at the same position as that of the inner circumferential surface with a smaller diameter in the radial direction. Therefore, the radial height of the inward protrusion 88a is the difference in dimension between the larger diameter side and the smaller diameter side of the dog sleeve 66a.

The coasting lock key 68a is formed in an annular shape and is provided with a plurality of (in the embodiment, three) key portions 90a formed at regular angles in the circumferential direction. The key portion 90a is formed in a substantially rectangular shape as viewed in the direction perpendicular to the axis CL direction. Each of the key portions 90a is formed to be fitted into the key groove 77a of the dog ring 64a in a state where the coasting lock key 68a is assembled to the dog ring 64a. The coasting lock key 68a and the dog ring 64a are connected to each other via the spring 69a (see FIG. 1) and are set such that the key portion 90a is fitted into the key groove 77a of the dog ring 64a as illustrated in FIG. 3 in a state in which no external force is applied to the coasting lock key 68a.

Figure 5:
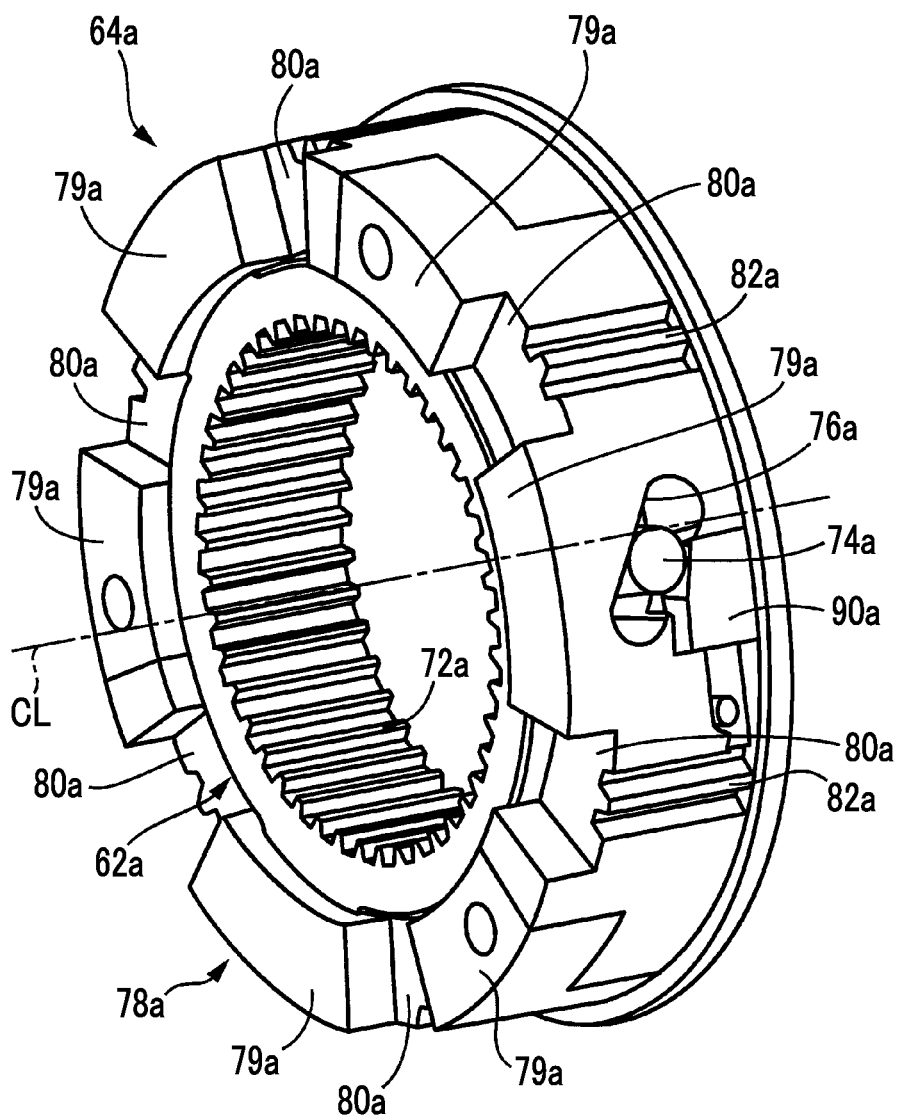
FIG. 5 is a view illustrating a state in which a tripod hub, a dog ring, and a coasting lock key in FIG. 2 are assembled.

FIG. 5 illustrates a state in which the tripod hub 62a, the dog ring 64a, and the coasting lock key 68a are assembled. As illustrated in FIG. 5, in the state in which the elements are assembled, the columnar portions 74a of the tripod hub 62a are accommodated in the long holes 76a of the dog ring 64a. When the tripod hub 62a and the dog ring 64a rotate relative to each other, the columnar portions 74a move in the longitudinal direction of the long holes 76a along the long holes 76a. When the columnar portions 74a move within the long holes 76a in the longitudinal direction, the relative positions of the tripod hub 62a and the dog ring 64a in the axis CL direction change.

Next, the operation of the first dog clutch 28a and the second dog clutch 28b configured as described above will be described with reference to FIG. 1. Since the structure of the second dog clutch 28b is basically the same as that of the first dog clutch 28a, the description of the structure of the second dog clutch 28b will be omitted. However, in order to distinguish the second dog clutch 28b from the first dog clutch 28a, the tripod hub, the dog ring, the dog sleeve, and the coasting lock key, and the spring included in the second dog clutch are denoted by reference numerals 62b, 64b, 66b, 68b, and 69b, respectively. In addition, the gear side dog teeth (crests and troughs), the columnar portions, the long holes, the key grooves, the dog teeth (crests and troughs), and the key portions are similarly denoted by reference numerals 38b (40b, 42b), 74b, 76b, 77b, 78b (79b, 80b), 90b, respectively. The gear side dog teeth 38b corresponds to the first dog teeth of the SUMMARY, the crest 40b of the dog tooth corresponds to the crest of the first dog tooth of the SUMMARY, the trough 42b of the dog tooth corresponds to the trough of the first dog tooth of the SUMMARY, the dog teeth 78b correspond to the second dog teeth of the SUMMARY, the crest 79b of the dog tooth corresponds to the crest of the second dog tooth of the SUMMARY, and the trough 80b of the dog tooth corresponds to the trough of the second dog tooth of the SUMMARY.

FIG. 1 illustrates the connection states (engagement states) of the first dog clutch 28a and the second dog clutch 28b during traveling at the N-speed gear stage. As illustrated in FIG. 1, during traveling at the N-speed gear stage, the dog teeth 78b of the second dog clutch 28b and the gear side dog teeth 38b formed in the second transmission gear 30b are engaged with each other. In addition, in the first dog clutch 28a, the dog teeth are disengaged.

With regard to the first dog clutch 28a, as the shift fork 54a is moved away from the first transmission gear 30a in the axis CL direction, the dog sleeve 66a and the dog ring 64a are also moved away from the first transmission gear 30a in the axis CL direction. At this time, the columnar portion 74a of the tripod hub 62a moves toward the end portion of the long hole 76a in the longitudinal direction positioned closer to the first transmission gear 30a in the axis CL direction when the long hole 76a is viewed in the radially inward direction. In this state, the key portion 90a of the coasting lock key 68a is fitted into the key groove 77a by the biasing force of the spring 69a such that the movement of the columnar portion 74a in the longitudinal direction of the long hole 76a is impeded by the key portion 90a.

With regard to the second dog clutch 28b, as the shift fork 54b is moved toward the second transmission gear 30b in the axis CL direction, the dog sleeve 66b and the dog ring 64b are also moved toward the second transmission gear 30b in the axis CL direction. At this time, the columnar portion 74b of the tripod hub 62b moves toward the end portion of the long hole 76b in the longitudinal direction positioned away from the second transmission gear 30b in the axis CL direction when the long hole 76b is viewed in the radially inward direction. In this state, the key portion 90b of the coasting lock key 68b is fitted into the key groove 77b by the biasing force of the spring 69b such that the movement of the columnar portion 74b in the longitudinal direction of the long hole 76b is impeded by the key portion 90b.

Figure 6:
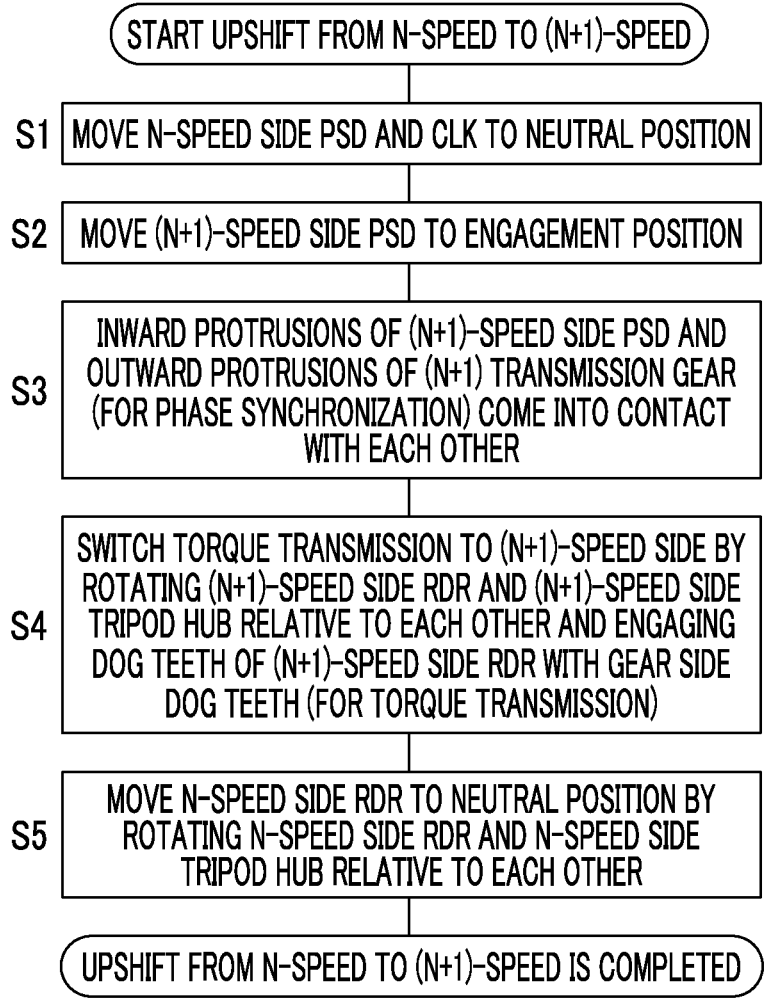
FIG. 6 is a flowchart illustrating a shifting operation during an upshift from an N-speed gear stage to an (N+1)-speed gear stage.
Figure 7:
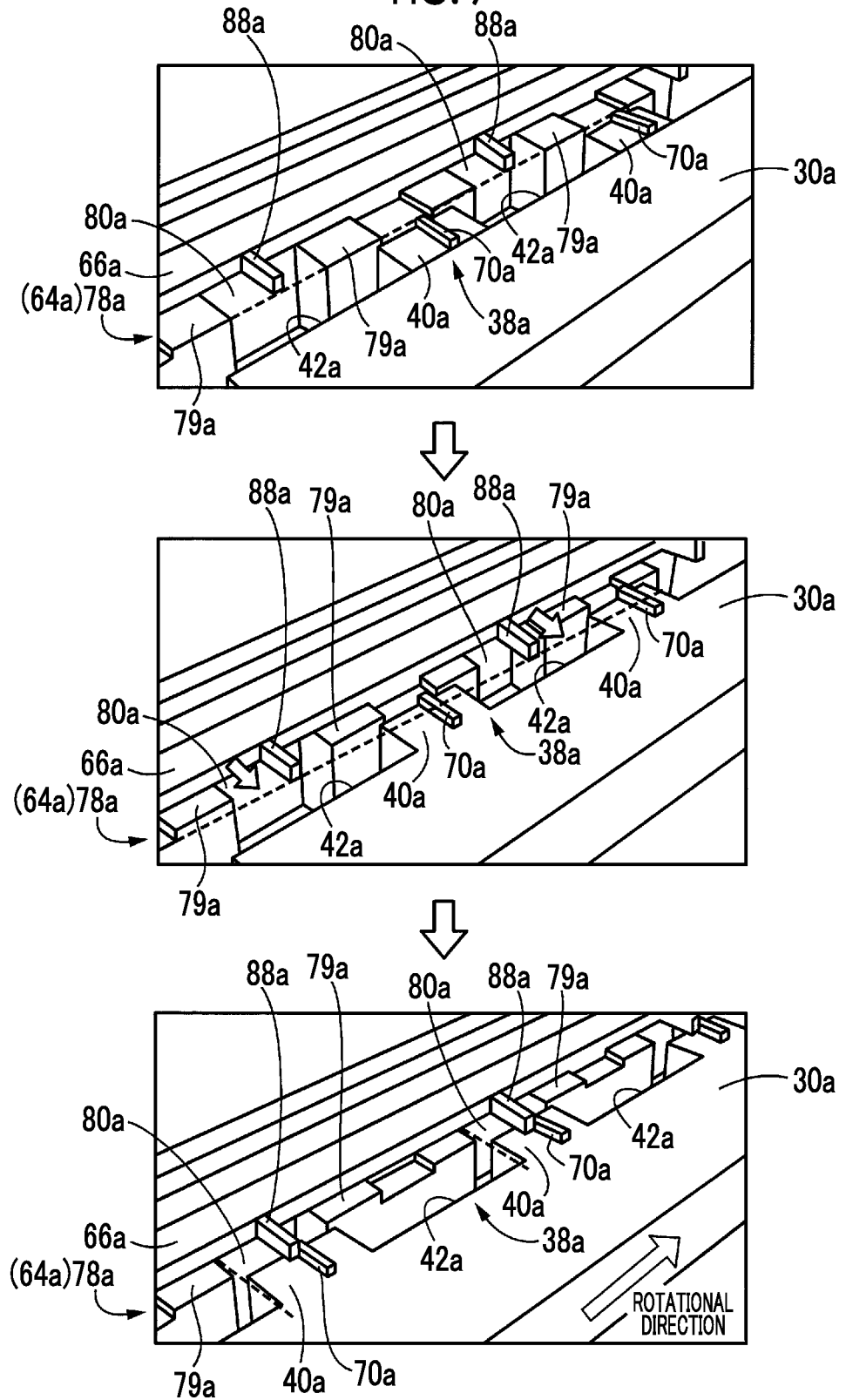
FIG. 7 is a view sequentially illustrating the connection states of the first dog clutch connected during the upshift to the (N+1)-speed gear stage.

A shifting operation for an upshift from the state of the N-speed gear stage illustrated in FIG. 1 to the (N+1)-speed gear stage will be described. FIG. 6 is a flowchart illustrating the Shifting operation during the upshift from the N-speed gear stage to the (N+1)-speed gear stage. FIG. 7 sequentially illustrates the connection states of the first dog clutch 28a connected during the upshift to the (N+1)-speed gear stage. FIG. 7 illustrates a state in which parts of the first transmission gear 30a and the dog ring 64a and the dog sleeve 66a included in the first dog clutch 28a in the rotational direction are linearly deployed.

The upper part of FIG. 7 illustrates the engagement states of the gear side dog teeth 38a of the first transmission gear 30a and the dog teeth 78a of the dog ring 64a before the start of connection of the first dog clutch 28a. At this time, since the outward protrusions 70a formed on the crests 40a of the dog teeth and the inward protrusions 88a formed in the dog sleeve 66a are at positions at which the outward protrusions 70a and the inward protrusions 88a cannot be engaged with each other in the axis CL direction, the first transmission gear 30a and the dog sleeve 66a rotate relative to each other. In the state of the upper part of FIG. 7, the upshift to the (N+1)-speed gear stage is executed based on the flowchart illustrated in FIG. 6.

In step S1 of FIG. 6, the dog sleeve 66b (N-speed side Phase Synchro Dog sleeve) and the coasting lock key 68b (N-speed side Coasting Lock Key) of the second dog clutch 28b corresponding to the N-speed gear stage move to the neutral position (a position away from the second transmission gear 30b). At this time, the coasting lock key 68b is pressed by the dog sleeve 66b and moves in the axis CL direction such that the fitting between the long hole 76b and the key portion 90b is released and the columnar portion 74b is allowed to move within the long hole 76b. However, the state in which the driving force is transmitted between the dog ring 64b (the dog teeth 78b) and the second transmission gear 30b (the gear side dog teeth 38b) at the N-speed gear stage is maintained such that the dog ring 64b and the tripod hub 62b do not rotate relative to each other. Therefore, the columnar portion 74b does not move toward the other side of the long hole 76b in the longitudinal direction, and the engagement between the dog teeth 78b of the dog ring 64b and the gear side dog teeth 38b of the second transmission gear 30b is maintained. That is, even when the dog sleeve 66b and the coasting lock key 68b move in the axis CL direction, the dog ring 64b does not move in the axis CL direction.

In step S2, the dog sleeve 66a ((N+1)-speed side Phase Synchro Dog sleeve) of the first dog clutch 28a corresponding to the (N+1)-speed gear stage is moved to a connection position (engagement position) of the first dog clutch 28a. The connection position (engagement position) is a position at which the outward protrusions 70a of gear side dog teeth 38a and the inward protrusions 88a of the dog sleeve 66a can come into contact with each other, and corresponds to the middle part of FIG. 7. That is, the middle part of FIG. 7 illustrates a state in which the dog sleeve 66a is moved in a direction indicated by the arrow via the shift fork 54a, and is thus moved to a position at which the outward protrusions 70a of the gear side dog teeth 38a and the inward protrusions 88a of the dog sleeve 66a can come into contact (be engaged) with each other.

In step S3, as the first transmission gear 30a and the dog sleeve 66a rotate relative to each other, the inward protrusions 88a of the dog sleeve 66a and the outward protrusions 70a of the first transmission gear 30a are brought into contact with each other. The lower part of FIG. 7 corresponds to the state of S3. As illustrated in the lower part of FIG. 7, as the first transmission gear 30a and the dog sleeve 66a rotate relative to each other, the outward protrusions 70a of the first transmission gear 30a and the inward protrusions 88a of the dog sleeve 66a are brought into contact with each other.

Here, the dog sleeve 66a having the inward protrusions 88a formed therein, the dog ring 64a fitted to the dog sleeve 66a, and the coasting lock key 68a solely have a change in rotational speed when the outward protrusions 70a and the inward protrusions 88a come into contact with each other. That is, the tripod hub 62a, the input shaft 18, and the members rotating together with the input shaft 18 (the second dog clutch 28b and the like) do not have a change in rotational speed even when the outward protrusions 70a and the inward protrusions 88a come into contact with each other. Furthermore, since the inertial mass of the dog sleeve 66a, the dog ring 64a, and the coasting lock key 68a is sufficiently smaller than the inertial mass of the input shaft 18 and the like, an impact load regarding the outward protrusions 70a and the inward protrusions 88a is small when the outward protrusions 70a and the inward protrusions 88a come into contact with each other. Therefore, a reduction in durability caused by the impact load regarding the outward protrusions 70a and the inward protrusions 88a is suppressed. In addition, since no impact load is applied to the gear side dog teeth 38a, the interval between the crests 40a of the gear side dog teeth 38a adjacent to each other (that is, the circumferential length of the trough 42a of the gear side dog tooth 38a) can be made larger than in the related art by reducing the circumferential dimension of the crest 40a of the gear side dog tooth 38.

As illustrated in the lower part of FIG. 7, the gear side dog teeth 38a and the dog teeth 78a are formed at positions at which the gear side dog teeth 38a and the dog teeth 78a can be engaged with each other in the circumferential direction in the state in which the outward protrusions 70a and the inward protrusions 88a are in contact with each other. That is, in the state in which the outward protrusions 70a and the inward protrusions 88a are in contact with each other, the crest 40a of the gear side dog tooth 38a and the trough 80a of the dog tooth 78a are set to be aligned with each other in the circumferential direction (the rotational direction), and the trough 42a of the gear side dog tooth 38a and the crest 79a of the dog tooth 78a are set to be aligned with each other in the circumferential direction (the rotational direction). Therefore, when the outward protrusions 70a and the inward protrusions 88a come into contact with each other, a rotational position (phase) at which the gear side dog teeth 38a and the dog teeth 78a of the dog ring 64a can be engaged with each other is achieved. That is, in this state, when the dog ring 64a moves toward the first transmission gear 30a in the axis CL direction, the gear side dog teeth 38 and the dog teeth 78 are engaged with each other such that the first dog clutch 28a is connected.

In step S4, due to the relative rotation of the dog ring 64a ((N+1)-speed side Rotation Dog Ring) and the tripod hub 62a ((N+1)-speed side tripod hub), the dog teeth 78a of the dog ring 64a and the gear side dog teeth 38a are engaged with each other. When the outward protrusions 70a and the inward protrusions 88a come into contact with each other, the dog ring 64a and the first transmission gear 30a rotate integrally with each other while the tripod hub 62a and the input shaft 18 rotate integrally with each other. Therefore, relative rotation occurs between the tripod hub 62a and the dog ring 64a. Due to the relative rotation, as indicated by the broken line in FIG. 1, the columnar portion 74a of the tripod hub 62a presses the key portion 90a of the coasting lock key 68a and moves to the other side of the long hole 76a. At this time, the dog ring 64a moves toward the first transmission gear 30a in the axis CL direction. In a transitional period in which the columnar portion 74a moves within the long hole 76a, no torque is transmitted between the gear side dog teeth 38a and the dog teeth 78a.

In the state in which the outward protrusions 70a and the ward protrusions 88a are in contact with each other, the gear side dog teeth 38a of the first transmission gear 30a and the dog teeth 78a are in a state capable of being engaged with each other. Therefore, as the dog ring 64a moves toward the first transmission gear 30a in the axis CL direction, the gear side dog teeth 38a and the dog teeth 78a are reliably engaged with each other. As the gear side dog teeth 38a and the dog teeth 78a are engaged with each other, a torque transmission path is switched from a path via the second transmission gear 30b and the second counter gear 32b (the N-speed gear stage side) to a path via the first transmission gear 30a and the first counter gear 32a (the (N+1)-speed gear stage side). In addition, the shape (the inclination tingle, and the length in the longitudinal direction) of the long hole 76a is adjusted such that the dog ring 64a moves toward the first transmission gear 30a to a position at which the gear side dog teeth 38a and the dog teeth 78a are engaged with each other when the tripod hub 62a and the dog ring 64a rotate relative to each other. In addition, the rigidity of the spring 69a is also adjusted to be pressed by the columnar portion 74a and elastically deformed when the tripod hub 62a and the dog ring 64a rotate relative to each other.

Figure 8:
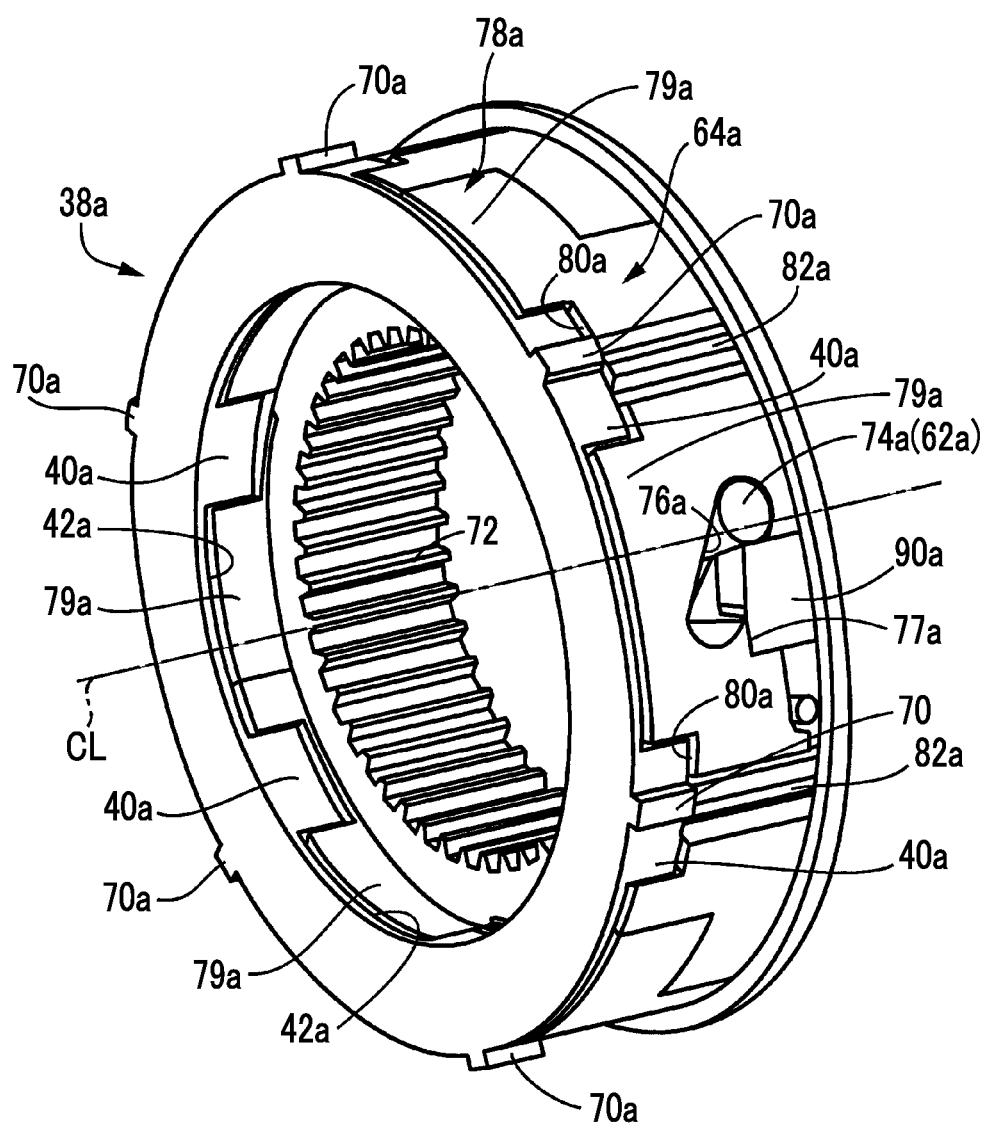
FIG. 8 is a view illustrating a state in which gear side dog teeth of a first transmission gear and dog teeth of the dog ring in FIG. 1 are engaged with each other.

FIG. 8 illustrates the state in which the gear side dog teeth 38a of the first transmission gear 30a and the dog teeth 78a of the dog ring 64a are engaged with each other. As the columnar portion 74a of the tripod hub 62a moves toward the other side of the long hole 76a in the longitudinal direction illustrated in FIG. 8, the dog ring 64a moves toward the first transmission gear 30a in the axis CL direction such that the gear side dog teeth 38a and the dog teeth 78a are engaged with each other. In addition, in a transitional period in which the columnar portion 74a of the tripod hub 62a moves within the long hole 76a, the columnar portion 74a moves to press the key portion 90a against the biasing force of the spring 69a (see FIG. 5), and when the columnar portion 74a moves to the other side of the long hole 76a in the longitudinal direction, the key portion 90a is restored to the state of being fitted into the key groove 77a by the biasing force of the spring 69a as illustrated in FIG. 8.

In step S5, a torque is transmitted between the gear side dog teeth 38a of the first transmission gear 30a and the dog teeth 78a of the dog ring 64a corresponding to the (N+1)-speed gear stage. Therefore, no torque is transmitted between the gear side dog teeth 38b of the second transmission gear 30b and the dog teeth 78b of the dog ring 64b corresponding to the N-speed gear stage. At this time, as the tripod hub 62b rotates at a rotational speed corresponding to the (N+1)-speed gear stage, the tripod hub 62b and the dog ring 64b (N-speed side Rotation Dog Ring) rotate relative to each other. As the tripod hub 62b and the dog ring 64b rotate relative to each other, the columnar portion 74b of the tripod hub 62b moves to a position indicated by the broken line in FIG. 1 along the long hole 76b. That is, the dog ring 64b moves away from the second transmission gear 30b in the axis CL direction such that the gear side dog teeth 38b and the dog teeth 78b are disengaged from each other.

Figure 9:
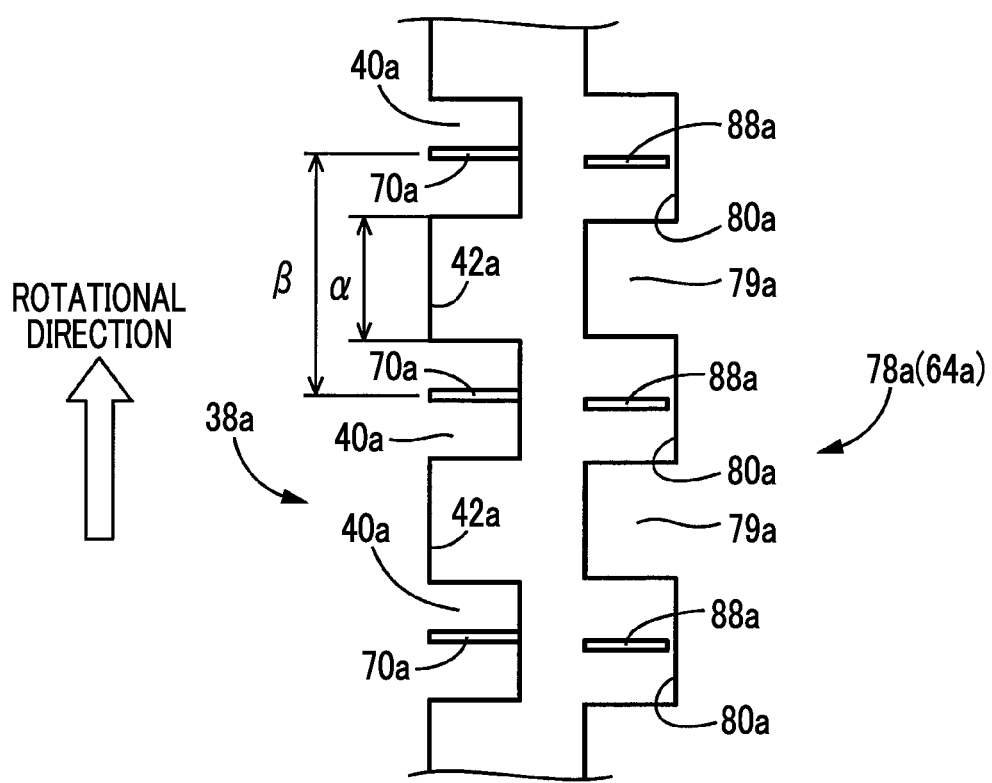
FIG. 9 is a view illustrating the positional relationship between the gear side dog teeth formed in the first transmission gear, outward protrusions formed in the gear side dog teeth, the dog teeth formed in the dog ring, and inward protrusions formed in the dog sleeve in FIG. 1.

The positional relationship in the rotational direction between the gear side dog teeth 38a formed in the first transmission gear 30a, the outward protrusions 70a formed in the gear side dog teeth 38a, the dog teeth 78a formed in the dog ring 64a, and the inward protrusions 88a formed in the dog sleeve 66a is illustrated in FIG. 9. The up-down direction of FIG. 9 corresponds to the rotational direction of each tooth. As illustrated in FIG. 9, since the outward protrusion 70a is formed on the outer circumferential surface of the crest 40a of the dog tooth 38a and the circumferential length of the outward protrusion 70a is shorter than the circumferential length of the crest 40a of the dog tooth 38a, the interval β between the outward protrusions 70a in the circumferential direction is greater than the circumferential length α of the trough 42a of the dog tooth 38a (β>α).

In the embodiment, when the inward protrusion 88a is interposed between the outward protrusions 70a adjacent to each other in the circumferential direction and the outward protrusion 70a and the inward protrusion 88a come into contact with each other, a rotational position at which the gear side dog teeth 38a and the dog teeth 78a can be engaged with each other is achieved. Therefore, a period during which the inward protrusion 88a can be interposed between the outward protrusions 70a adjacent to each other substantially becomes a period during which the dog teeth can be engaged. Therefore, the period during which the gear side dog teeth 38a and the dog teeth 78a can be engaged with each other is significantly increased. Furthermore, since the circumferential length of the inward protrusion 88a is shorter than the circumferential length of the crest 79a of the dog tooth 78a, the period during which the inward protrusion 88a can be interposed between the outward protrusions 70a is further increased. Therefore, the period during which the gear side dog teeth 38a and the dog teeth 78a can be engaged with each other is further increased.

In the related art, since the outward protrusions 70a and the inward protrusions 88a are not formed, the timing at which the gear side dog teeth 38a and the dog teeth 78a can be engaged with each other is when the crests 40a of the gear side dog teeth 38a are aligned with the troughs 80a of the dog teeth 78a in the rotational direction (in other words, the troughs 42a of the gear side dog teeth 38a and the crests 79a of the dog teeth 78a are aligned with each other in the rotational direction), and thus is a very short period. Since the engagement needs to be achieved within the short period, detection of the phase of each tooth by a sensor, an operation of a shifting timing based on the phase, and a high-speed shifting operation are needed, and a high-performance control device (ECU) and a high-performance actuator are needed. In the embodiment, without using the high-performance control device and the high-performance actuator, the period during which the gear side dog teeth 38a and the dog teeth 78a can be engaged with each other can be increased.

Furthermore, in the embodiment, in the state in which the outward protrusions 70a and the inward protrusions 88a come into contact with each other and the phase at which the gear side dog teeth 38a and the dog teeth 78a can be engaged with each other is achieved, engagement of the dog teeth is started. Therefore, the gap (backlash) formed between the dog teeth in the state in which the gear side dog teeth 38a and the dog teeth 78a are engaged with each other can be reduced. Accordingly, the relative movement amount of the dog teeth can be reduced when the vehicle switches from acceleration to deceleration or from deceleration to acceleration, and an impact exerted when the dog teeth collide with each other during switching from acceleration to deceleration or from deceleration to acceleration can be reduced. Therefore, there are advantages in terms of the strength and durability of the dog teeth, and changes in the vehicle behavior due to the collision are also reduced, resulting in an improvement in ride comfort and drivability.

As described above, according to the embodiment, when the dog ring 64a moves toward the first transmission gear 30a in the axis CL direction, the inward protrusions 88a also move toward the first transmission gear 30a, and thus the outward protrusions 70a and the inward protrusions 88a enter the state capable of coming into contact with each other. In addition, when the outward protrusions 70a and the inward protrusions 88a come into contact with each other as the first transmission gear 30a and the dog ring 64a rotate relative to each other, the gear side dog teeth 38a and the dog teeth 78a enter the state capable of being engaged with each other. Here, the circumferential length of the outward protrusion 70a is shorter than the circumferential length of the crest 40a of the gear side dog tooth 38a on which the outward protrusion 70a is formed, the interval β between the outward protrusions 70a in the circumferential direction is greater than the interval β between the troughs 42a of the gear side dog teeth 38a in the circumferential direction. Here, the period during which the inward protrusion 88a can be interposed between the outward protrusions 70a adjacent to each other in the circumferential direction substantially becomes the period during which the gear side dog teeth 38a and the dog teeth 78a can be engaged with each other. As a result, the period during which the gear side dog teeth 38a and the dog teeth 78a can be engaged with each other can be made longer than that in the related art.

In addition, according to the embodiment, since the inward protrusion 88a is formed to be shorter than the circumferential length of the crest 79a of the dog tooth 78a, the period during which the inward protrusion 88a can be interposed between the outward protrusions 70a adjacent to each other in the circumferential direction can be further increased. Therefore, the period during which the gear side dog teeth 38a and the dog teeth 78a can be engaged with each other can be further increased.

Moreover, according to the embodiment, when the outward protrusions 70a and the inward protrusions 88a come into contact with each other, the rotational speed of the dog sleeve 66a and the dog ring 64a becomes equal to the rotational speed of the first transmission gear 30a having the gear side dog teeth 38a formed therein. At this time, the impact load applied to the outward protrusions 70a and the inward protrusions 88a is proportional to the inertial mass of the dog sleeve 66a and the dog ring 64a which have a change in rotational speed. Here, since the inertial mass of the dog sleeve 66a and the dog ring 64a is sufficiently smaller than that of the input shaft 18 and the like, the impact load decreases. Therefore, a reduction in the durability of the outward protrusions 70a and the inward protrusions 88a can be suppressed. In addition, when the outward protrusions 70a and the inward protrusions 88a come into contact with each other, the tripod hub 62a and the input shaft 18 rotate integrally with each other while the dog ring 64a and the first transmission gear 30a rotate integrally with each other such that the dog ring 64a and the tripod hub 62a rotate relative to each other. When the dog ring 64a and the tripod hub 62a rotate relative to each other, the columnar portion 74a accommodated in the long hole 76a moves toward the other side of the long hole 76a in the longitudinal direction. Here, since the long hole 76a is inclined at the predetermined gradient with respect to the circumferential direction, by adjusting the length and the gradient of the long hole 76a in the longitudinal direction, the dog ring 64a can be moved toward the first transmission gear 30a and thus the gear side dog teeth 38a and the dog teeth 78a can be engaged with each other when the columnar portion 74a moves within the long hole 76a.

Next, another embodiment of the present disclosure will be described. In the following description, like parts common to the above-described embodiment are denoted by like reference numerals, and the description of the common parts will be omitted.

In the above-described embodiment, the outward protrusion 70a is formed on the crest 40a of the gear side dog tooth 38a, and the inward protrusion 88a is formed in the dog sleeve 66a at the same position as that of the trough 80a of the dog tooth 78a in the circumferential direction as viewed in the axis CL direction. In the embodiment, an outward protrusion is formed on the outer circumference of the trough of a gear side dog tooth, and an inward protrusion is formed in a dog sleeve at the same position as that of the crest of a dog tooth in the circumferential direction.

Figure 10:
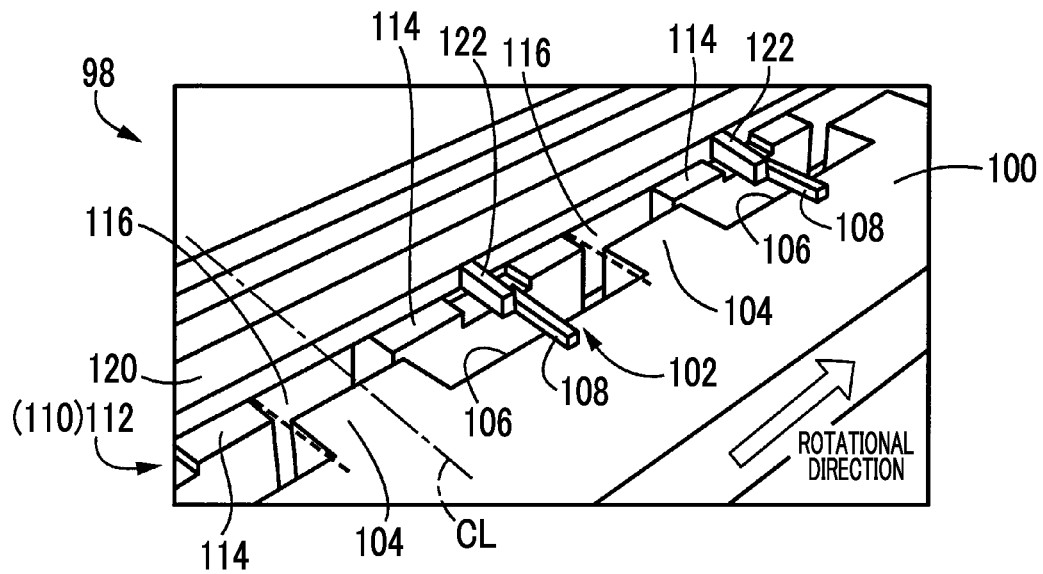
FIG. 10 is a view illustrating the structure of a dog clutch according to another embodiment of the present disclosure.

FIG. 10 illustrates the structure of a dog clutch 98 corresponding to the embodiment, and corresponds to the lower part of FIG. 7 of the above-described embodiment. As illustrated in FIG. 10, gear side dog teeth 102 are formed in a transmission gear 100. The gear side dog teeth 102 are configured such that crests 104 of dog teeth and troughs 106 of the dog teeth are alternately arranged in the circumferential direction. The transmission gear 100 corresponds to the rotating member of the SUMMARY, the gear side dog teeth 102 corresponds to the first dog teeth of the SUMMARY, the crest 104 of the dog tooth corresponds to the crest of the first dog tooth of the SUMMARY, and the trough 106 of the dog tooth corresponds to the trough of the first dog tooth of the SUMMARY.

In addition, a plurality of outward protrusions 108 protruding radially outwardly from the outer circumferences of the troughs 106 of the dog teeth is formed. The outward protrusion 108 is a rectangular parallelepiped member that is formed in the transmission gear 100, protrudes radially outwardly from the position of the outer circumference of the trough 106 of the gear side dog tooth 102, and extends parallel to the axis CL. The outward protrusion 108 is formed near the center of the trough 106 of the dog tooth in the circumferential direction. The outward protrusion 108 is formed in a rectangular shape as viewed in the direction perpendicular to the axis CL direction and extends to the same position as the end surface of the crest 104 of the dog tooth in the axis CL direction from the transmission gear 100 in the axis CL direction. The circumferential length of the outward protrusion 108 is shorter than the circumferential length of the trough 106 of the gear side dog tooth 102. The outward protrusion 108 corresponds to the first protrusion of the SUMMARY.

Dog teeth 112 which can be engaged with the gear side dog teeth 102 are formed in a dog ring 110 formed in an annular shape. The dog teeth 112 are configured such that crests 114 of the dog teeth 112 protruding toward the transmission gear 100 in the axis CL direction and troughs 116 of the dog teeth 112 are alternately arranged. The dog teeth 112 corresponds to the second dog teeth of the SUMMARY, the crest 114 of the dog tooth corresponds to the crest of the second dog tooth of the SUMMARY, and the trough 116 of the dog tooth corresponds to the trough of the second dog tooth of the SUMMARY.

A dog sleeve 120 formed in an annular shape is disposed on the outer circumferential side of the dog ring 110 and is fitted to the dog ring 110 so as to be movable in the axis CL direction and not to rotate relative to the dog ring 110. A plurality of inward protrusions 122 is formed in the dog sleeve 120 to protrude radially inwardly from the inner circumferential surface of the dog sleeve 120. The inward protrusions 122 are respectively formed at the same positions as those of the crests 114 of the dog teeth 112 in the circumferential direction as viewed in the axis CL direction. Specifically, when the inward protrusions 122 are viewed in the axis CL direction, the inward protrusion 122 is formed at the same position as the vicinity of the center of the crest 114 of the dog tooth 112 in the circumferential direction formed in the dog ring 110 in the circumferential direction. In addition, the inward protrusions 122 are formed to come into contact with the outward protrusions 108 in the circumferential direction when the dog sleeve 120 moves toward the transmission gear 100 in the axis CL direction. In addition, the circumferential length of the inward protrusion 122 is shorter than the circumferential length of the trough 116 of the dog tooth 112 (that is, the interval between the crests 114 of the dog teeth 112 adjacent to each other). The inward protrusion 122 corresponds to the second protrusion of the SUMMARY.

In addition, the outward protrusion 108 and the inward protrusion 122 are configured to come into contact with each other when the dog sleeve 120 moves toward the transmission gear 100 in the axis CL direction and the transmission gear 100 and the dog sleeve 120 rotate relative to each other. Specifically, the outward protrusion 108 and the inward protrusion 122 are formed at the same position in the radial direction with respect to the axis CL, and when the dog sleeve 120 moves toward the transmission gear 100 in the axis CL direction, at least portions of the outward protrusion 108 and the inward protrusion 122 are formed to overlap in the axis CL direction.

Furthermore, as illustrated in FIG. 10, the gear side dog teeth 102 and the dog teeth 112 are formed such that the gear side dog teeth 102 and the dog teeth 112 can be engaged with each other in the state in which the outward protrusions 108 and the inward protrusions 122 are in contact with each other. That is, the gear side dog teeth 102 and the dog teeth 112 are formed such that when the outward protrusions 108 and the inward protrusions 122 come into contact with each other, the crest 104 of the gear side dog tooth 102 and the trough 116 of the dog tooth 112 are set to be aligned with each other in the circumferential direction (rotational direction), and the trough 106 of the gear side dog tooth 102 and the crest 114 of the dog tooth 112 are aligned with each other in the circumferential direction (the rotational direction).

As in the above-described embodiment, the dog ring 110 is connected to the input shaft via the tripod hub, and as the outward protrusions 108 and the inward protrusions 122 come into contact with each other and the dog ring 110 and the tripod hub rotate relative to each other during shifting, the dog ring 110 moves toward the transmission gear 100 in the axis CL direction. Therefore, the gear side dog teeth 102 and the dog teeth 112 are engaged with each other. Since the specific operation of the dog ring 110 during shifting is basically the same as that of the dog ring 64a, the detailed description of the operation of the dog ring 110 will be omitted.

Even in the embodiment, the dog sleeve 120, the dog ring 110, and the coasting lock key (not illustrated) solely have a change in rotational speed when the outward protrusions 108 and the inward protrusions 122 come into contact with each other. Since the inertial mass of the elements is sufficiently smaller than that of the input shaft and the like, an impact load regarding the outward protrusions 108 and the inward protrusions 122 is also small when the outward protrusions 108 and the inward protrusions 122 come into contact with each other.

Figure 11:
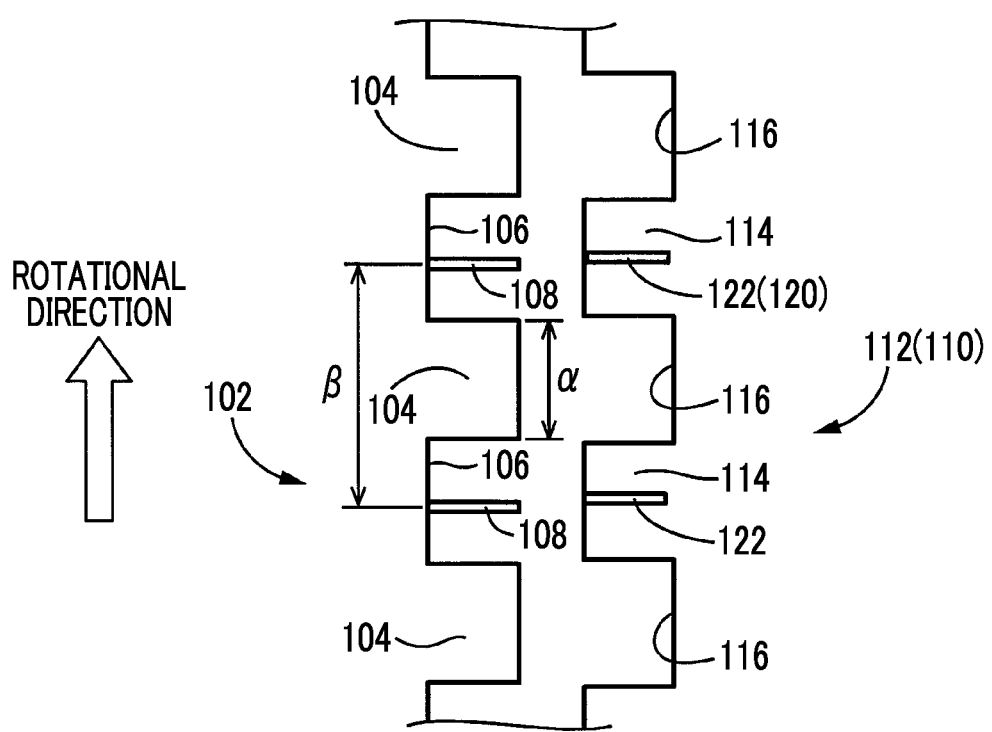
FIG. 11 is a view illustrating the positional relationship between gear side dog teeth formed in a first transmission gear, outward protrusions formed in the gear side dog teeth, dog teeth formed in a dog ring, and inward protrusions formed in a dog sleeve in FIG. 10.

FIG. 11 illustrates the positional relationship in the rotational direction (circumferential direction) between the gear side dog teeth 102, the outward protrusions 108 formed in the gear side dog teeth 102, the dog teeth 112 formed in the dog ring 110, and the inward protrusions 122 formed in the dog sleeve 120, and corresponds to FIG. 9 of the above-described embodiment. As illustrated in FIG. 11, the outward protrusion 108 is formed near the center of the trough 106 of the gear side dog tooth 102 in the circumferential direction, and the circumferential length of the outward protrusion 108 is shorter than the circumferential length of the trough 106 of the gear side dog tooth 102. Accordingly, the interval $\beta$ between the outward protrusions 108 adjacent to each other in the circumferential direction is greater than the circumferential length $\alpha$ of the crest 104 of the gear side dog tooth 102 ($\beta > \alpha$).

In the embodiment, when the inward protrusion 122 is interposed between the outward protrusions 108 adjacent to each other in the circumferential direction and the outward protrusion 108 and the inward protrusion 122 come into contact with each other, a circumferential position (rotational position) at which the gear side dog teeth 102 and the dog teeth 112 can be engaged with each other is achieved. Therefore, a period during which the inward protrusion 122 can be interposed between the outward protrusions 108 adjacent to each other substantially becomes a period during which the dog teeth can be engaged. Therefore, the period during which the gear side dog teeth 102 and the dog teeth 112 can be engaged with each other can be significantly increased. Furthermore, since the circumferential length of the inward protrusion 122 is shorter than the circumferential length of the trough 116 of the dog tooth 112, the period during which the inward protrusion 122 can be interposed between the outward protrusions 108 adjacent to each other is further increased. Therefore, the period during which the gear side dog teeth 102 and the dog teeth 112 can be engaged with each other is further increased. As described above, even in the embodiment, the same effects as those of the above-described embodiment can be obtained.

While the embodiments of the present disclosure have been described in detail with reference to the drawings, the present disclosure is also applicable to other aspects.

For example, in the above-described embodiment, the number of the columnar portions 74a of the tripod hub 62a is three, but the number of the columnar portions 74a is not limited thereto and can be appropriately changed. In addition, the number of the crests 40a and the troughs 42a of the gear side dog teeth 38a, the number of the outward protrusions 70a, and the number of the inward protrusions 88a are all six, but the number is not limited thereto and can be appropriately changed.

In the above-described embodiment, the dog clutches 28a, 28b are provided on the input shaft 18. However, the dog clutches 28a, 28b are not limited thereto and may also be provided on the countershaft 20 side.

The above description is merely an embodiment, and the present disclosure can be implemented in modes with various modifications and improvements based on the knowledge of those skilled in the art.

What is claimed is:

1. A dog clutch comprising:
   a rotating member including first dog teeth;
   an annular dog ring including second dog teeth, the second dog teeth configured to be engaged with the first dog teeth; and
   an annular dog sleeve that is fitted to the dog ring such that the dog sleeve is not able to rotate relative to the dog ring and is relatively movable in an axial direction of the dog clutch, wherein:
   the rotating member includes first protrusions protruding radially outwardly from outer circumferences of crests or troughs of the first dog teeth;
   the dog sleeve includes second protrusions that are configured to come into contact with the first protrusions in a circumferential direction of the dog clutch when the dog sleeve moves toward the rotating member in the axial direction;
   a circumferential length of each of the first protrusions is shorter than a circumferential length of each of the crests or the troughs of the first dog teeth on which the first protrusions are located; and
   the first dog teeth and the second dog teeth are disposed at positions at which the first dog teeth and the second dog teeth are configured to be engaged with each other in the circumferential direction in a state in which the first protrusions and the second protrusions are in contact with each other.

2. The dog clutch according to claim 1, wherein:
   the rotating member includes the first protrusions protruding from the outer circumferences of the crests of the first dog teeth; and
   the second protrusion is shorter than a circumferential length of a crest of each of the second dog teeth.

3. The dog clutch according to claim 1, wherein:
   the rotating member includes the first protrusions protruding from the outer circumferences of the troughs of the first dog teeth; and
   the second protrusion is shorter than a circumferential length of a trough of each of the second dog teeth.

4. The dog clutch according to claim 1, further comprising a hub positioned on an inner circumferential side of the dog ring, wherein:
   the hub is configured to be connected to a rotating shaft such that an inner circumferential portion of the hub is not able to rotate relative to the rotating shaft;
   the hub includes a columnar portion protruding radially outwardly from an outer circumferential surface of the hub;
   the dog ring includes a long hole that accommodates the columnar portion; and
   the long hole is inclined at a predetermined gradient with respect to the circumferential direction of the dog ring.

* * * * *

UNITED STATES PATENT AND TRADEMARK OFFICE
CERTIFICATE OF CORRECTION

PATENT NO. : 10,557,506 B2  
APPLICATION NO. : 15/782344  
DATED : February 11, 2020  
INVENTOR(S) : Tomohiro Yoshimura et al.

Page 1 of 1

It is certified that error appears in the above-identified patent and that said Letters Patent is hereby corrected as shown below:

On the Title Page

Please change Item (71), Column 1, Lines 2-7, from "Applicants: TOYOTA JIDOSHA KABUSHIKI KAISHA, Toyota-shi, Aichi-ken (JP); AISIN AI CO., LTD, Nishio-shi, Aichi-ken (JP); KABUSHIKI KAISHA TOYOTA CHUO KENKYUSHO, Nagakute-shi, Aichi-ken (JP)" to -- Applicants: TOYOTA JIDOSHA KABUSHIKI KAISHA, Toyota-shi, Aichi-ken (JP); KABUSHIKI KAISHA TOYOTA CHUO KENKYUSHO, Nagakute-shi, Aichi-ken (JP) --

Signed and Sealed this  
Fifth Day of May, 2020

Andrei Iancu  
*Director of the United States Patent and Trademark Office*